(12) United States Patent　　(10) Patent No.:　US 12,380,309 B2
De la Cruz Marin et al.　　(45) Date of Patent:　　Aug. 5, 2025

(54) RADIO FREQUENCY VOLTAGE LIMITER FOR AN RFID TRANSPONDER

(71) Applicant: NXP B.V., Eindhoven (NL)

(72) Inventors: Jorge Vicente De la Cruz Marin, Graz (AT); Lukas Zoescher, Graz (AT); Slawomir Rafal Malinowski, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/512,188

(22) Filed: Nov. 17, 2023

(65) Prior Publication Data

US 2025/0165739 A1　　May 22, 2025

(51) Int. Cl.
　　*G06K 19/06*　　(2006.01)
　　*G06K 19/07*　　(2006.01)
(52) U.S. Cl.
　　CPC ..... *G06K 19/0715* (2013.01); *G06K 19/0723* (2013.01)
(58) Field of Classification Search
　　CPC .......... G06K 19/0723; G06K 19/0715; G06K 19/0701; G06K 19/0713; G06K 19/07749; G06K 19/0709; G06K 7/10158
　　USPC .............. 235/492, 462.46, 472.02
　　See application file for complete search history.

(56) References Cited

U.S. PATENT DOCUMENTS

| | | | |
|---|---|---|---|
| 4,866,301 A | 9/1989 | Smith | |
| 5,045,770 A | 9/1991 | Brooks | |
| 5,874,829 A | 2/1999 | Holweg et al. | |
| 6,134,130 A | 10/2000 | Connell et al. | |
| 7,703,677 B2 | 4/2010 | Alihodzic | |
| 7,929,265 B2 | 4/2011 | Brandl et al. | |
| 8,314,685 B2 | 11/2012 | Balachandran et al. | |
| 8,702,008 B2* | 4/2014 | Springer | G06K 19/0701 235/492 |

(Continued)

FOREIGN PATENT DOCUMENTS

EP　　2963587 B1　　3/2017

OTHER PUBLICATIONS

Bakhtiar, Alireza Sharif et al.; "A high-efficiency CMOS rectifier for low-power RFID tags"; 2010 IEEE International Conference on RFID (IEEE RFID 2010); Apr. 14-16, 2010, Orlando, Florida; DOI: 10.1109/RFID.2010.5467271.

(Continued)

*Primary Examiner* — Daniel St Cyr
(74) *Attorney, Agent, or Firm* — Dan Hill

(57) ABSTRACT

A radio frequency (RF) voltage limiter for a radio frequency identification (RFID) transponder is provided. The RF voltage limiter includes an envelope detector configured to track an envelope of a signal received at the antenna. The envelope detector has an output for providing an envelope signal. A peak detector is included and has an input coupled to the output of the envelope detector. The peak detector includes a current mirror having an input coupled to the output of the envelope detector, and an output configured to provide a control signal. A shunt circuit is coupled to provide an impedance to the antenna in response to the control signal. The impedance decreases with an increasing voltage of the control signal to limit a maximum voltage at the antenna. In another embodiment, a method is provided for limiting a RF voltage at the antenna.

20 Claims, 8 Drawing Sheets

(56) References Cited

U.S. PATENT DOCUMENTS

| | | | |
|---|---|---|---|
| 8,963,611 B2* | 2/2015 | See | H03H 7/40 |
| | | | 333/17.3 |
| 10,033,364 B1 | 7/2018 | Coban | |
| 11,556,751 B2 | 1/2023 | Pichler et al. | |
| 2010/0189196 A1* | 7/2010 | Wang | H04L 27/06 |
| | | | 329/347 |
| 2014/0324138 A1* | 10/2014 | Wentz | A61N 5/0622 |
| | | | 607/90 |
| 2021/0067097 A1* | 3/2021 | Wang | H03F 1/0227 |
| 2021/0143774 A1* | 5/2021 | Cummings | H01M 10/6551 |
| 2022/0198236 A1* | 6/2022 | Pichler | G06K 19/0724 |
| 2023/0135571 A1 | 5/2023 | Rebollo Pimentel et al. | |

OTHER PUBLICATIONS

Balachandran, Ganesh K. et al.; "A Passive UHF RFID Demodulator With RF Overvoltage Protection and Automatic Weighted Threshold Adjustment"; IEEE Transactions on Circuits and Systems I: Regular Papers ( vol. 57, Issue: 9, Sep. 2010); DOI: 10.1109/TCSI.2010.2073770.

Barnett, Ray et al.; "A Passive UHF RFID Transponder for EPC Gen 2 with—14dBm Sensitivity in 0.13μm CMOS"; 2007 IEEE International Solid-State Circuits Conference. Digest of Technical Papers; Feb. 11-15, 2007, San Francisco, California; DOI: 10.1109/ISSCC.2007.373554.

Missoni, Albert et al.; "A Triple-Band Passive RFID Tag"; 2008 IEEE International Solid-State Circuits Conference—Digest of Technical Papers; Feb. 3-7, 2008, San Francisco, California, DOI: 10.1109/ISSCC.2008.4523170.

Zoscher, Lukas et al.; "RF Voltage Limiters for Passive Differential UHF RFID Front-Ends in a 40 nm CMOS Technology"; 2015 IEEE MTT-S International Microwave Symposium; May 17-22, 2015, Phoenix, Arizona; DOI: 10.1109/MWSYM.2015.7166839.

* cited by examiner

RADIO FREQUENCY VOLTAGE LIMITER FOR AN RFID TRANSPONDER

BACKGROUND

Field

This disclosure relates generally to electronic circuits, and more particularly, to a radio frequency (RF) voltage limiter for radio frequency identification (RFID) transponders.

Related Art

Ultra-high frequency (UHF) RFID transponders, commonly referred to as RFID tags, are widely used to identify objects to which the tags are attached. The most common application examples of RFID tags are retail, supply chain management, shipping services, airline luggage tracking, laundry services, etc. An RFID tag typically includes an antenna and an integrated circuit (IC) (commonly referred to herein as a "chip"). An RFID transponder may communicate inductively with an RFID reader via an electrical, magnetic, or electromagnetic field generated by the RFID reader. In some circumstances, a UHF RFID transponder frontend implementation may experience an overvoltage caused by high levels of received antenna power when receiving an amplitude modulated reader signal. In complementary metal-oxide semiconductor (CMOS) technologies of advanced process nodes, the received high voltage at the transponder frontend may exceed the maximum voltage ratings of the IC, resulting in damage due to overvoltage stress. An RF voltage limiter may be used to avoid overvoltage conditions at the integrated RF frontend at high received antenna power levels. The RF limiter of an RFID tag chip may operate with a high peak detector discharge time to minimize distortions when receiving an amplitude-modulated signal from a reader. Implementing a high peak detector discharge time in the order of several hundred micro seconds (µs) by means of passive components can occupy a large chip area.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
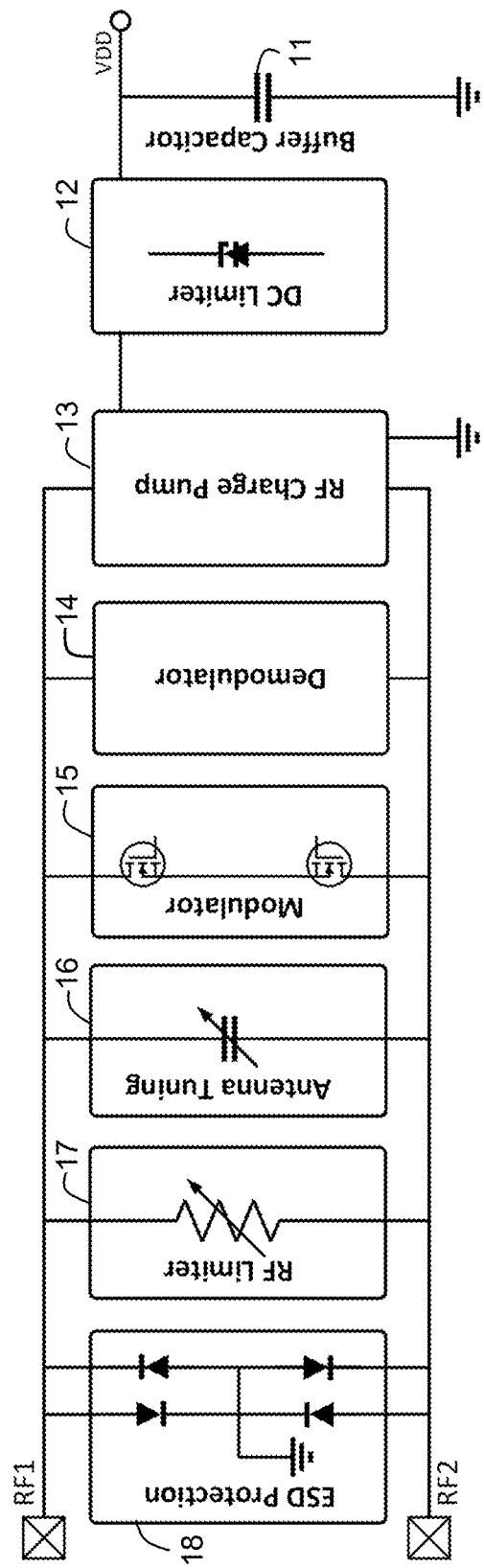
FIG. 1 illustrates a block diagram of a differential ultra-high frequency (UHF) RFID frontend in accordance with an embodiment.

Generally, there is provided, a RF voltage limiter for a UHF RFID transponder that includes an envelope detector, a peak detector, and a shunt circuit. The envelope detector provides an envelope signal that tracks a voltage envelope of a signal received at an antenna. The peak detector stage includes a current mirror acting as a rectifying buffer, and a current sink and a small filter capacitor to provide a control signal in response to the envelope signal to control the shunt circuit. The shunt circuit provides an impedance to control the maximum voltage at the antenna in response to the control signal. Use of the RF voltage limiter in a UHF RFID tag provides an area-efficient implementation of a peak detector with a high discharge time to minimize signal envelope distortions when receiving an amplitude-modulated signal from a reader.

In accordance with an embodiment, there is provided, a radio frequency (RF) voltage limiter for a radio frequency identification (RFID) transponder, the RF voltage limiter including: an envelope detector having an input coupled to an antenna, the envelope detector configured to track an envelope of a signal received at the antenna, the envelope detector having an output for providing an envelope signal; a peak detector having an input coupled to the output of the envelope detector, wherein the peak detector comprises a current mirror having an input coupled to the output of the envelope detector, and an output configured to provide a control signal; and a shunt circuit coupled to provide an impedance to the antenna in response to the control signal, wherein the impedance decreases with an increasing voltage magnitude of the control signal. The current mirror may include: a first transistor having a first current electrode and a control electrode both coupled to receive a reference current, and a second current electrode coupled to the output of the envelope detector; a second transistor having a first current electrode, a control electrode coupled to the control electrode of the first transistor, and a second current electrode coupled to provide the control signal to the shunt circuit, and wherein the peak detector may further include a first current source coupled between the first current electrode of the first transistor and a power supply voltage terminal, the first current source for providing the reference current. The RF voltage limiter may further include a capacitor coupled between the second current electrode of the second transistor and ground. The RF voltage limiter may further include: a second current source having a first terminal coupled to the second current electrode of the second transistor, and a second terminal coupled to a ground terminal; and a third current source having a first terminal coupled to the power supply voltage terminal, and a second terminal coupled to the first current electrode of the second transistor. The envelope detector may include two cross-coupled charge pump stages. Each of the cross-coupled charge pump stages may include a pair of cross-coupled P-channel metal-oxide semiconductor transistors (PMOS), and a pair of cross-coupled N-channel metal-oxide semiconductor transistors (NMOS), both pairs capacitively coupled to a first antenna terminal and a second antenna terminal of the RFID transponder. The antenna may include a first terminal and a second terminal, and the shunt circuit may include first and second transistors coupled between the first and second antenna terminals, and wherein a control electrode of both the first and second transistors may be coupled to receive the control signal. The RF voltage limiter may further include a switch having a first terminal coupled to the output of the envelope detector, and a second terminal coupled to the output of the peak detector, the switch may be configured to selectively bypass the peak detector during a power-up of an integrated circuit of the RFID transponder. The switch may be a transmission gate responsive to a power-on reset signal. In another embodiment, the switch may be implemented for a different reason.

In another embodiment, there is provided, a radio frequency identification (RFID) transponder including a radio frequency (RF) voltage limiter, the RF voltage limiter including: an envelope detector having an input coupled to an antenna, the envelope detector configured to track an envelope of a signal received at the antenna, and the envelope detector having an output for providing an envelope signal; a peak detector having an input coupled to the output of the envelope detector, wherein the peak detector comprises a current mirror having an input coupled to the output of the envelope detector, and an output configured to provide a control signal, wherein the control signal is configured to have a rising edge that rises with a rising edge of the envelope signal, and wherein the peak detector is configured to provide the control signal having a falling edge that more slowly follows a falling edge of the envelope signal; and a shunt circuit coupled to provide an impedance to the antenna in response to the control signal, wherein the impedance decreases with an increasing voltage magnitude of the control signal. The RFID transponder may further include a switch having a first terminal coupled to the output of the envelope detector, and a second terminal coupled to the output of the peak detector, the switch may be for selectively bypassing the peak detector during a power-up of an integrated circuit of the RFID transponder. The current mirror may include: a first transistor having a first current electrode and a control electrode coupled to receive a first reference current from a first current source, and a second current electrode coupled to the output of the envelope detector; a second transistor having a first current electrode, a control electrode coupled to the control electrode of the first transistor, and a second current electrode coupled to provide the control signal to the shunt circuit, and wherein the peak detector further comprises a second current source coupled between the second current electrode of the second transistor and a ground terminal. The RFID transponder may further include a third current source having a first terminal coupled to a power supply voltage terminal, and a second terminal coupled to the first current electrode of the second transistor. The antenna may include a first terminal and a second terminal, and the shunt circuit may include first and second transistors coupled between the first and second antenna terminals, and wherein a control electrode of both the first and second transistors may be coupled to receive the control signal. The envelope detector may include a charge pump.

In yet another embodiment, there is provided, a method for limiting a radio frequency (RF) voltage at an antenna, the method including: tracking an envelope of an RF signal at the antenna to produce an envelope signal; detecting a voltage level of the envelope signal using a current mirror, and providing a control signal, using the current mirror, that has a rising edge that rises with a rising edge of the envelope signal, and the control signal having a falling edge that follows more slowly than a falling edge of the envelope signal; and providing an impedance to the antenna in response to the control signal, wherein the impedance decreases with an increasing control signal. The current mirror may include: a first transistor having a first current electrode and a control electrode coupled to receive a first reference current, and a second current electrode coupled to the output of the envelope detector; and a second transistor having a first current electrode, a control electrode coupled to the control electrode of the first transistor, and a second current electrode coupled to provide the control signal to the shunt circuit. The falling edge of the control signal may follow the falling edge of the envelope signal more slowing using: a first current source having a first terminal coupled to the second current electrode of the second transistor, and a second terminal coupled to a ground terminal; and a capacitor having a first terminal coupled to the second current electrode of the second transistor, and a second terminal coupled to the ground terminal. Tracking the envelope may further include using a charge pump to produce the envelope signal. Providing the impedance to the antenna may further include using a shunt circuit including first and second transistors coupled between first and second antenna terminals of the antenna, and wherein a control electrode of both the first and second transistors is coupled to receive the control signal.

FIG. 1 illustrates a block diagram of differential ultra-high frequency (UHF) RFID frontend 10 for a RFID transponder in accordance with an embodiment. In one embodiment, RFID frontend 10 is implemented in one or more complementary metal-oxide semiconductor (CMOS) integrated circuits. RFID frontend 10 includes buffer capacitor 11, direct current (DC) limiter 12, RF charge pump 13, demodulator 14, modulator 15, antenna tuning circuit 16, RF voltage limiter 17, and electrostatic discharge (ESD) protection circuit 18. RF charge pump 13, demodulator 14, modulator 15, antenna tuning circuit 16, RF limiter 17, and ESD protection 18 are coupled to differential antenna terminals $RF_1$ and $RF_2$. DC limiter 12 has an input connected to an output of RF charge pump 13, and an output connected to a power supply voltage terminal labeled "VDD". Buffer capacitor 11 has a first terminal connected to VDD and a second terminal connected to a ground terminal.

RF charge pump 13 provides rectification and transformation of the received RF voltage from an antenna connected to antenna terminals $RF_1$ and $RF_2$ to provide a DC supply voltage for circuits of an integrated circuit (IC), e.g., a digital part and a non-volatile memory. Modulator 15 provides modulation of an input impedance to modulate the signal that is scattered back from the antenna to transmit information to a reader. Demodulator 14 provides for demodulation of an amplitude modulated signal transmitted by a reader and received at the antenna connected to antenna terminals $RF_1$ and $RF_2$. Antenna tuning circuit 16 provides tuning of the input capacitance to maximize the power transfer from the antenna to the chip input. Electrostatic discharge protection 18 may be implemented in various ways. One example implementation of ESD protection 18 includes anti-parallel pn-junction diodes. The anti-parallel diodes provides a path for high currents generated by an electrostatic discharge event at the antenna terminals that can damage circuits on the integrated circuit. DC limiter 12 regulates and limits the output voltage of RF charge pump 13.

RF voltage limiter 17 is connected between antenna terminals $RF_1$ and $RF_2$ to limit the RF voltage amplitude at high power levels received from an antenna to prevent overvoltage conditions of the RFID frontend circuits. In order to react quickly to rapidly rising power levels transmitted by an RFID reader during power-up of the RFID IC, RF limiter 17 can operate in a self-sustained mode at power-up when no accurate reference voltage or reference bias current has been generated yet.

As will be described below, several disclosed embodiments of RF voltage limiter 17 provide area-efficient implementations with high discharge time to minimize signal envelope distortions. Furthermore, the circuit topology facilitates a minimization of the quiescent current consumption. Note that even though a differential RFID frontend implementation is shown and described, a single-ended frontend implementation may be provided in which either terminal $RF_1$ or $RF_2$ corresponds to the chip ground.

Figure 2:
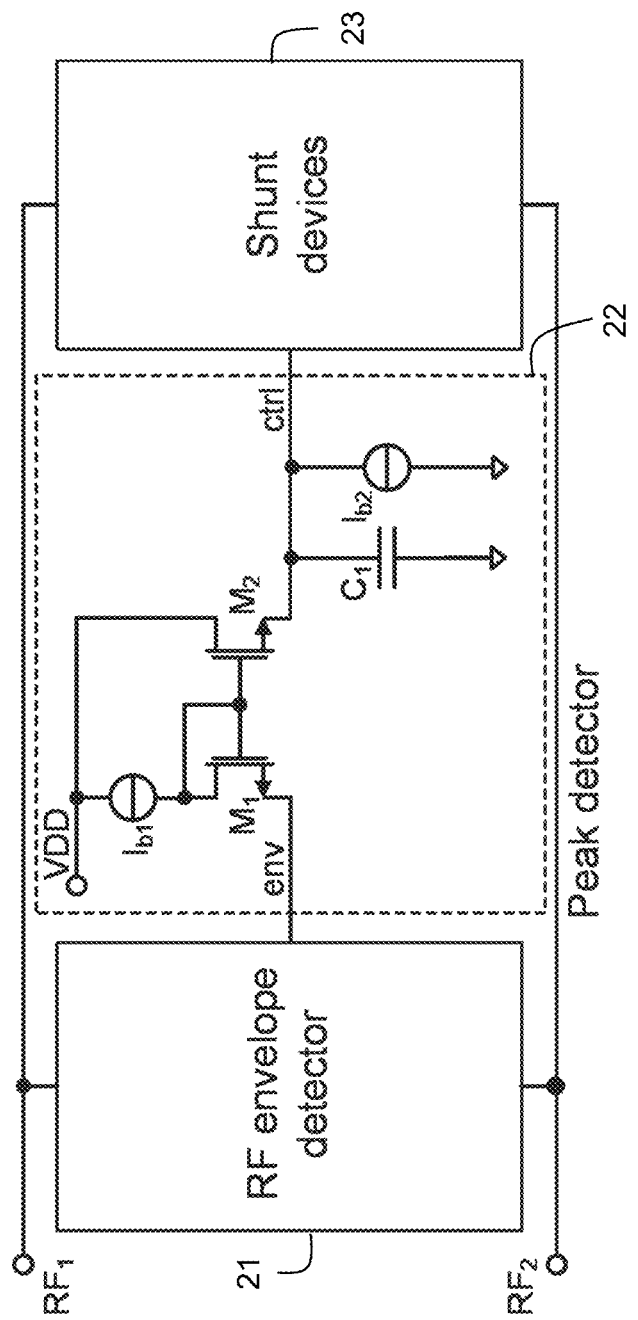
FIG. 2 illustrates the RF voltage limiter of the UHF RFID frontend of FIG. 1 according to an embodiment.

FIG. 2 illustrates RF voltage limiter 20 for use in UHF RFID frontend 10 of FIG. 1 according to an embodiment. RF voltage limiter 20 includes RF voltage envelope detector circuit 21, peak detector circuit 22, and shunt circuit 23. RF envelope detector 21 has an input connected to antenna terminals $RF_1$ and $RF_2$ and an output to provide an envelope signal labeled "env" that tracks the voltage envelope of the differential RF voltage at antenna terminals $RF_1$ and $RF_2$. Shunt devices 23 includes a controllable load impedance to load the RF signals at antenna terminals $RF_1$ and $RF_2$ to reduce a high RF input voltage amplitude to below the maximum operating voltage of the RFID frontend circuits. The shunt load impedance is controlled by a control signal labeled "ctrl." The impedance value with respect to antenna terminals $RF_1$ and $RF_2$ decreases with an increasing level of control signal ctrl.

Peak detector circuit 22 includes two N-channel metal-oxide semiconductor (NMOS) transistors $M_1$ and $M_2$ connected as a current mirror, current sources $I_{b1}$ and $I_{b2}$, and capacitor $C_1$. Current source $I_{b1}$ has a first terminal connected to power supply voltage terminal VDD, and a second terminal connected to the drain of first NMOS transistor $M_1$. First NMOS transistor $M_1$ is diode-connected and is biased by current source $I_{b1}$. The source of first transistor $M_1$ is connected to receive RF envelope signal env. Second transistor $M_2$ is biased with a gate-to-source voltage ($V_{GS}$) of first transistor $M_1$. The drain of second transistor $M_2$ is connected to power supply voltage terminal VDD and the source of second transistor $M_2$ is connected to provide shunt device control signal ctrl to an input of shunt circuit 23. Filter capacitor $C_1$ and a current sink $I_{b2}$ are both connected between the source of second transistor $M_2$ and a ground terminal. Control signal ctrl follows fast rising voltage levels of envelope signal env, but control signal ctrl follows falling voltage levels of envelope signal env more slowly with a signal slope defined by $C_1$ and $I_{b2}$. Providing a high discharge time minimizes signal envelope distortions. The use of peak detector 22 provides an area-efficient implementation and facilitates a lower quiescent current consumption as compared with a classic filter implementation.

Figure 3:
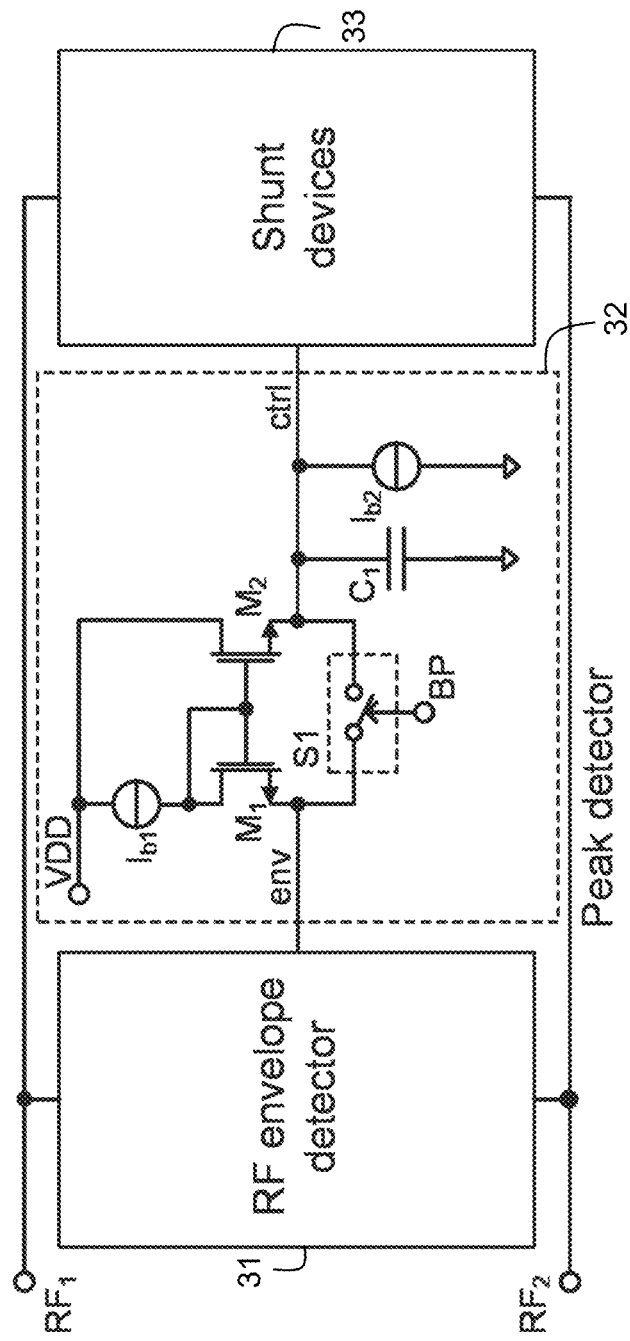
FIG. 3 illustrates the RF voltage limiter of the UHF RFID frontend of FIG. 1 according to another embodiment.

FIG. 3 illustrates RF voltage limiter 30 for use in UHF RFID frontend 10 of FIG. 1 according to another embodiment. RF voltage limiter 30 includes RF envelope detector 31, peak detector circuit 32, and shunt circuit 33. Peak detector circuit 32 is essentially the same as peak detector circuit 22 except that peak detector circuit 32 includes a bypass switch S1 coupled between the sources of first and second transistors $M_1$ and $M_2$. Switch S1 is controlled by a control signal labeled BP.

When switch S1 is open RF voltage limiter 30 operates the same as described above for RF voltage limiter 20. When switch S1 is in a closed state, envelope signal env from RF envelope detector circuit 31 is provided directly to shunt circuit 33 as control signal ctrl, thus bypassing peak detector circuit 32 and the shunt circuit 33 is controlled by envelope signal env. In this way, the inclusion of switch S1 provides RF voltage limiter circuit 30 with the ability to operate in a self-sustained mode, e.g., during power-up when there are no accurate reference voltages or bias currents, and even if bias currents $I_{b1}$ and $I_{b2}$ are equal to zero amperes.

Switch S1 is controlled by digital input signal BP. The switch control signal BP may be derived, for example, from a power-on reset signal generated by another circuit of the RFID transponder IC to reset the digital part of the IC to a defined state if the supply voltage becomes too low. In this way, switch S1 may be switched to the closed state during the power-up of the IC, when bias currents $I_{b1}$ and $I_{b2}$ are still undefined, and switch S1 may be switched to the open state once the chip power-up is completed to enable operation of peak detector circuit 32. This will allow peak detector circuit 32 to operate shunt circuit 33 with a discharge time as defined by control signal ctrl. Alternatively, switch control signal BP may be used to temporarily close switch S1 during chip operations to refresh the voltage level of control signal ctrl in order to track rapidly occurring changes of the RF voltage envelope at antenna terminals $RF_1$ and $RF_2$. In another embodiment, switch S1 may be controlled with a different control signal and for a different reason than described above for control signal BP.

Figure 4:
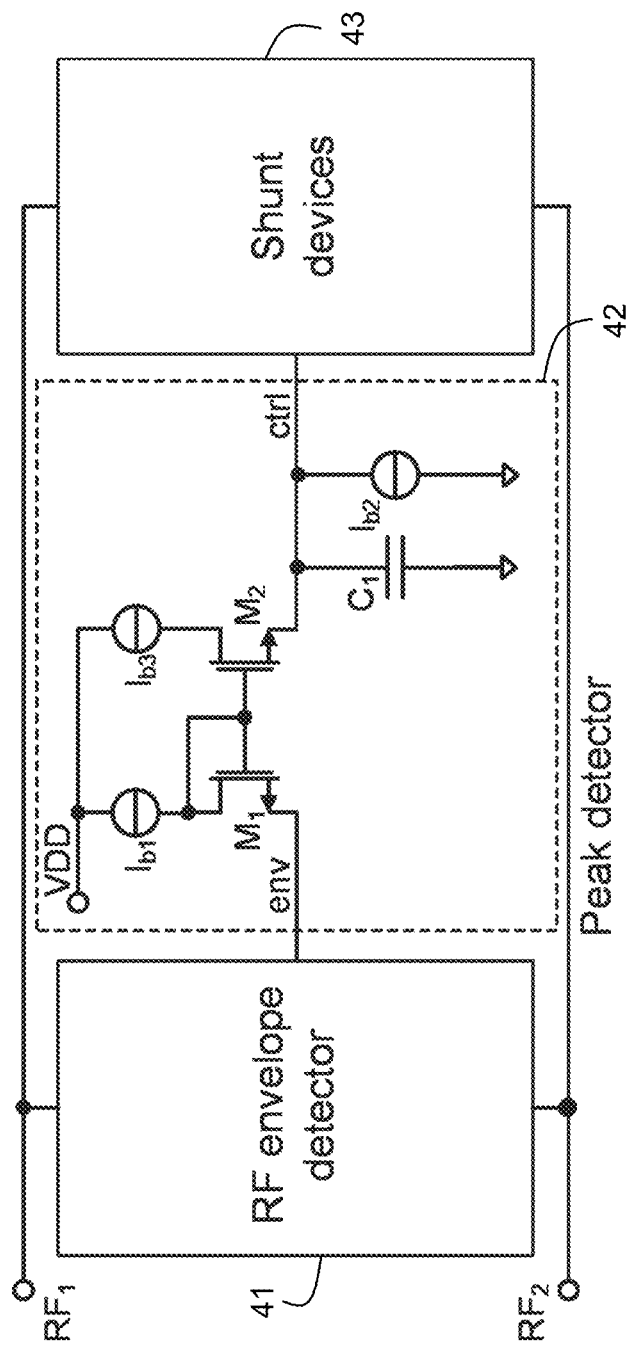
FIG. 4 illustrates the RF voltage limiter of the UHF RFID frontend of FIG. 1 according to another embodiment.

FIG. 4 illustrates RF voltage limiter 40 for use in UHF RFID frontend 10 of FIG. 1 according to another embodiment. RF voltage limiter 40 includes RF envelope detector 41, peak detector circuit 42, and shunt circuit 43. Peak detector circuit 42 is essentially the same as peak detector circuit 22 except that peak detector circuit 42 includes current source $I_{b3}$ connected between power supply voltage terminal VDD and the drain of the current mirror transistor $M_2$.

Current source $I_{b3}$ limits the charging current of capacitor $C_1$ at rising voltage levels of control signal env, and thus limits the rising voltage slope of control signal ctrl. This can limit the impact of short transients, such as overshoots. More time is required to charge capacitor $C_1$ providing better control.

Figure 5:
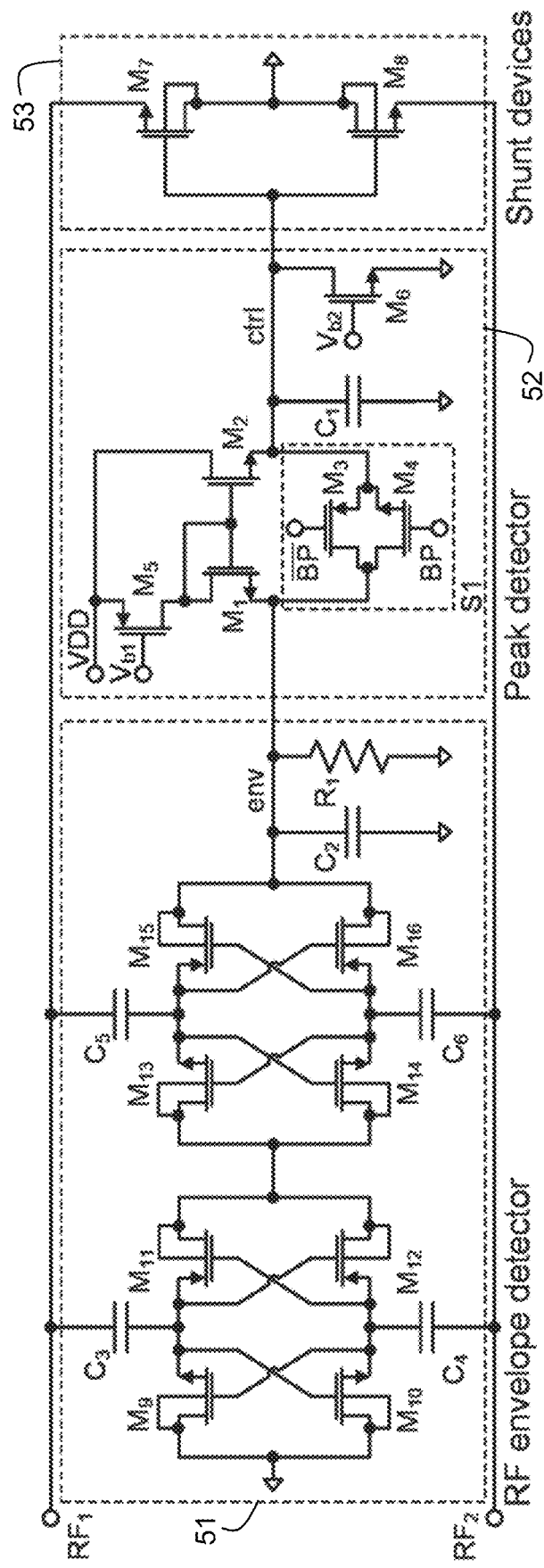
FIG. 5 illustrates the RF voltage limiter of the UHF RFID frontend of FIG. 1 according to another embodiment.

FIG. 5 illustrates RF voltage limiter 50 of the UHF RFID frontend of FIG. 1 according to another embodiment. RF voltage limiter 50 includes RF envelope detector 51, peak detector circuit 52, and shunt circuit 53. RF envelope detector 51 includes two cross-coupled charge pump stages, a load resistor $R_1$ and a filter capacitor $C_2$. A first charge pump stage includes a pair of cross-coupled NMOS transistors $M_9$ and $M_{10}$, a pair of cross-coupled PMOS transistors $M_{11}$ and $M_{12}$, and capacitors $C_3$ and $C_4$ for capacitively connecting the pairs of cross-coupled transistors to antenna terminals $RF_1$ and $RF_2$. A second charge pump stage includes a pair of cross-coupled NMOS transistors $M_{13}$ and $M_{14}$, a pair of cross-coupled PMOS transistors $M_{15}$ and $M_{16}$, and capacitors $C_5$ and $C_6$ for capacitively connecting the pairs of cross-coupled transistors to antenna terminals $RF_1$ and $RF_2$. An input of the first charge pump is connected to a ground terminal, and an output of the second charge pump provides envelope signal env. At RF voltage amplitudes of higher than a threshold voltage of the charge pump switching devices $M_9$-$M_{16}$, envelope signal env tracks the envelope of the differential RF voltage at antenna terminals $RF_1$ and $RF_2$. The charge pump stages are used to provide rectification and amplification.

Shunt circuit 53 is implemented using two NMOS transistors $M_7$ and $M_8$. Source terminals of NMOS transistors $M_7$ and $M_8$ are connected to antenna terminals $RF_1$ and $RF_2$, respectively. Drain terminals are connected to chip ground, and the gates of transistors $M_7$ and $M_8$ are connected to receive control signal ctrl.

Peak detector 52 is derived from peak detector 22 of FIG. 2. Current sources $I_{b1}$ and $I_{b2}$ of peak detector 22 of FIG. 2 are implemented by PMOS transistor $M_5$ and NMOS transistor $M_6$ biased by bias voltages $V_{b1}$ and $V_{b2}$, respectively. Bias voltages $V_{b1}$ and $V_{b2}$ are generated using a bias circuit (not shown). Switch $S_1$ is implemented by a transmission gate consisting of transistors $M_3$ and $M_4$, and control signal BP of FIG. 2 is replaced with complementary control signals BP and $\overline{BP}$. Note that in another embodiment, the conductivity types of the transistors may be reversed such that the resulting circuit is essentially a mirror of the illustrated RF voltage limiter. In addition, in another embodiment the type of transistors may be different. Also note in another embodiment, the current sources may be implemented differently, e.g., with a resistor or another type of device.

Figure 6:
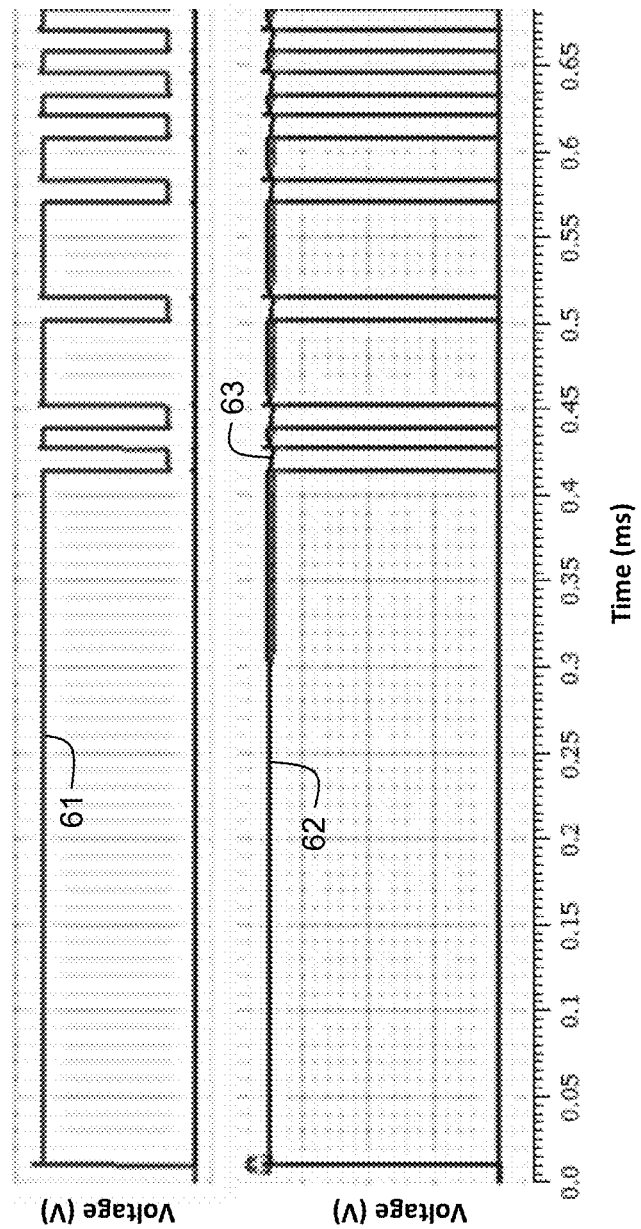
FIG. 6 illustrates various signal waveforms of the RF voltage limiter of FIG. 5.

FIG. 6 illustrates various signal waveforms of RF voltage limiter 50 of FIG. 5. Assume that switch $S_1$ is open, and peak detector 52 is therefore enabled. The time constant of an envelope detector output filter defined by $R_1C_2$ is much lower than the pulse width of the amplitude-modulated signal 61 received at antenna terminals $RF_1$ and $RF_2$. As can be seen, envelope signal env 62 tracks the received modulation envelope 61. For example, the envelope detector filter time constant may be in a range of 10 nano seconds (ns), while the minimum modulation pulse width of a signal transmitted by an RFID reader according to the EPC Generation-2 UHF RFID specification equals, e.g., 2 μs. The discharge voltage slope of control signal ctrl 63 is defined by $I_{b2}/C_1$, where $I_{b2}$ is the current through $M_6$ and $C_1$ represents the capacitance of capacitor $C_1$. The discharge voltage slope is very low compared to the modulation pulse width. The voltage of control signal ctrl 63 therefore appears to remain mostly constant during a modulation pulse, as shown in FIG. 6. The discharge time slope of peak detector 52 may be, for example, in a range of about 1 mV/μs.

Figure 7B:
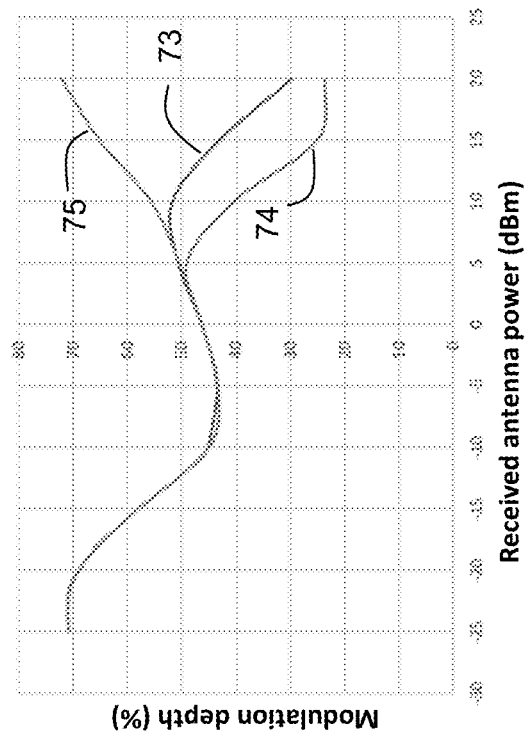
FIG. 7B illustrates modulation depth versus received antenna power for the RF voltage limiter of FIG. 5.
Figure 7A:
FIG. 7A illustrates RF voltage amplitude versus received antenna power for the RF voltage limiter of FIG. 5.

FIGS. 7A and 7B illustrate characteristics of a received RF voltage signal at antenna terminals of a UHF RFID tag chip. FIG. 7A illustrates RF voltage amplitude versus received antenna power in decibel milliwatts (dBm) for the RF voltage limiter of FIG. 5. Curve 71 illustrates RF voltage amplitude versus received antenna power for no RF voltage limiter. Curves 72 illustrates RF voltage amplitude versus received antenna power for RF voltage limiter 50 with the peak detector 52 both bypassed and not bypassed.

FIG. 7B illustrates modulation depth versus received antenna power for RF voltage limiter 50 of FIG. 5. Curve 73 illustrates modulation depth versus received antenna power for a UHF RFID tag chip with no RF voltage limiter. Curve 74 illustrates modulation depth versus received antenna power for the RF voltage limiter with the peak detector bypassed. Curve 75 illustrates modulation depth versus received antenna power for the RF voltage limiter with the peak detector not bypassed.

As illustrated in FIGS. 7A and 7B, RF limiter 50 with enabled peak detector 52 limits the peak RF voltage amplitude at received power levels of larger than 5 dBm and enhances the modulation depth of the received amplitude-modulated signal, which facilitates demodulation.

Figure 8:
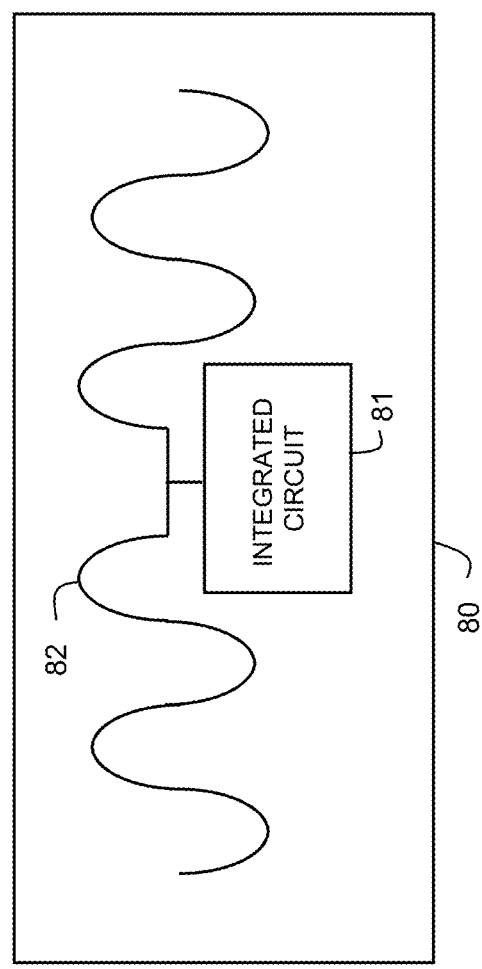
FIG. 8 illustrates radio frequency identification (RFID) tag according to an embodiment.

FIG. 8 illustrates radio frequency identification (RFID) tag 80 according to an embodiment. RFID tag 80 includes IC 81 (chip) and antenna 82 connected to an antenna connection of IC 81. RFID tag 80 may be a transponder for communicating wirelessly with a reader. There are various frequency ranges that can be used depending on the application. RFID tag 80 may be passive and receive power to operate wirelessly from a reader device (not shown) via antenna 82, or may be active and have its own power source. There are various ways RFID tag 80 may be implemented. In one embodiment, RFID tag 80 is implemented on a flexible tape with an adhesive on one side to allow RFID tag 80 to be attached to an object to be identified. There are also various ways to implement antenna 82 depending on the application.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A radio frequency (RF) voltage limiter for a radio frequency identification (RFID) transponder, the RF voltage limiter comprising:
    an envelope detector having an input coupled to an antenna, the envelope detector configured to track an envelope of a signal received at the antenna, the envelope detector having an output for providing an envelope signal;
    a peak detector having an input coupled to the output of the envelope detector, wherein the peak detector comprises a current mirror having an input coupled to the output of the envelope detector, and an output configured to provide a control signal;
    a shunt circuit coupled to provide an impedance to the antenna in response to the control signal, wherein the impedance decreases with an increasing voltage magnitude of the control signal;
    a first transistor having a first current electrode and a control electrode both coupled to receive a reference current, and a second current electrode coupled to the output of the envelope detector; and
    a second transistor having a first current electrode, a control electrode coupled to the control electrode of the first transistor, and a second current electrode coupled to provide the control signal to the shunt circuit.

2. The RF voltage limiter of claim 1, wherein the envelope detector comprises two cross-coupled charge pump stages.

3. The RF voltage limiter of claim 2, wherein each of the cross-coupled charge pump stages comprises a pair of cross-coupled P-channel metal-oxide semiconductor transistors (PMOS), and a pair of cross-coupled N-channel metal-oxide semiconductor transistors (NMOS), both pairs capacitively coupled to a first antenna terminal and a second antenna terminal of the RFID transponder.

4. The RF voltage limiter of claim 1, wherein the antenna comprises a first terminal and a second terminal, and the shunt circuit comprises first and second transistors coupled between the first and second antenna terminals, and wherein a control electrode of both the first and second transistors is coupled to receive the control signal.

5. The RF voltage limiter of claim 1, further comprising a switch having a first terminal coupled to the output of the envelope detector, and a second terminal coupled to the output of the peak detector, the switch configured to selectively bypass the peak detector during a power-up of an integrated circuit of the RFID transponder.

6. The RF voltage limiter of claim 5, wherein the switch is a transmission gate responsive to a power-on reset signal.

7. A radio frequency (RF) voltage limiter for a radio frequency identification (RFID) transponder, the RF voltage limiter comprising:
an envelope detector having an input coupled to an antenna, the envelope detector configured to track an envelope of a signal received at the antenna, the envelope detector having an output for providing an envelope signal;
a peak detector having an input coupled to the output of the envelope detector, wherein the peak detector comprises a current mirror having an input coupled to the output of the envelope detector, and an output configured to provide a control signal; and
a shunt circuit coupled to provide an impedance to the antenna in response to the control signal, wherein the impedance decreases with an increasing voltage magnitude of the control signal;
a first transistor having a first current electrode and a control electrode both coupled to receive a reference current, and a second current electrode coupled to the output of the envelope detector;
a second transistor having a first current electrode, a control electrode coupled to the control electrode of the first transistor, and a second current electrode coupled to provide the control signal to the shunt circuit; and
wherein the peak detector further comprises a first current source coupled between the first current electrode of the first transistor and a power supply voltage terminal, the first current source for providing the reference current.

8. The RF voltage limiter of claim 7, further comprising a capacitor coupled between the second current electrode of the second transistor and ground.

9. The RF voltage limiter of claim 8, further comprising:
a second current source having a first terminal coupled to the second current electrode of the second transistor, and a second terminal coupled to a ground terminal; and
a third current source having a first terminal coupled to the power supply voltage terminal, and a second terminal coupled to the first current electrode of the second transistor.

10. A radio frequency identification (RFID) transponder comprising a radio frequency (RF) voltage limiter, the RF voltage limiter comprising:
an envelope detector having an input coupled to an antenna, the envelope detector configured to track an envelope of a signal received at the antenna, and the envelope detector having an output for providing an envelope signal;
a peak detector having an input coupled to the output of the envelope detector, wherein the peak detector comprises a current mirror having an input coupled to the output of the envelope detector, and an output configured to provide a control signal, wherein the control signal is configured to have a rising edge that rises with a rising edge of the envelope signal, and wherein the peak detector is configured to provide the control signal having a falling edge that more slowly follows a falling edge of the envelope signal;
a shunt circuit coupled to provide an impedance to the antenna in response to the control signal, wherein the impedance decreases with an increasing voltage magnitude of the control signal;
a first transistor having a first current electrode and a control electrode coupled to receive a first reference current, and a second current electrode coupled to the output of the envelope detector; and
a second transistor having a first current electrode, a control electrode coupled to the control electrode of the first transistor, and a second current electrode coupled to provide the control signal to the shunt circuit.

11. The RFID transponder of claim 10, further comprising a switch having a first terminal coupled to the output of the envelope detector, and a second terminal coupled to the output of the peak detector, the switch for selectively bypassing the peak detector during a power-up of an integrated circuit of the RFID transponder.

12. The RFID transponder of claim 10,
wherein the peak detector further comprises from a first current source coupled to the first current electrode and the first control electrode and a second current source coupled between the second current electrode of the second transistor and a ground terminal.

13. The RFID transponder of claim 12, further comprising a third current source having a first terminal coupled to a power supply voltage terminal, and a second terminal coupled to the first current electrode of the second transistor.

14. The RFID transponder of claim 10, wherein the antenna comprises a first terminal and a second terminal, and the shunt circuit comprises first and second transistors coupled between the first and second antenna terminals, and wherein a control electrode of both the first and second transistors is coupled to receive the control signal.

15. The RFID transponder of claim 10, wherein the envelope detector comprises a charge pump.

16. A method for limiting a radio frequency (RF) voltage at an antenna, the method comprising:
tracking an envelope of an RF signal at the antenna to produce an envelope signal;
detecting a voltage level of the envelope signal using a current mirror, and providing a control signal, using the current mirror, that has a rising edge that rises with a rising edge of the envelope signal, and the control signal having a falling edge that follows more slowly than a falling edge of the envelope signal wherein the current mirror comprises:
a first transistor having a first current electrode and a control electrode coupled to receive a first reference current, and a second current electrode coupled to an output of an envelope detector; and
a second transistor having a first current electrode, a control electrode coupled to the control electrode of the first transistor, and a second current electrode coupled to provide the control signal to a shunt circuit; and providing an impedance to the antenna in response to the control signal, wherein the impedance decreases with an increasing control signal.

17. The method of claim 16, wherein the current mirror comprises:
- a first transistor having a first current electrode and a control electrode coupled to receive a first reference current, and a second current electrode coupled to the output of the envelope detector; and
- a second transistor having a first current electrode, a control electrode coupled to the control electrode of the first transistor, and a second current electrode coupled to provide the control signal to the shunt circuit.

18. The method of claim 17, wherein the falling edge of the control signal follows the falling edge of an envelope signal more slowing using:
- a first current source having a first terminal coupled to the second current electrode of the second transistor, and a second terminal coupled to a ground terminal; and
- a capacitor having a first terminal coupled to the second current electrode of the second transistor, and a second terminal coupled to the ground terminal.

19. The method of claim 16, wherein tracking the envelope further comprises using a charge pump to produce the envelope signal.

20. The method of claim 16, wherein providing the impedance to the antenna further comprises using a shunt circuit comprising first and second transistors coupled between first and second antenna terminals of the antenna, and wherein a control electrode of both the first and second transistors is coupled to receive the control signal.

* * * * *